Feb. 20, 1962    E. E. SHELDON    3,021,834
ENDOSCOPES
Filed Nov. 28, 1956    4 Sheets-Sheet 1
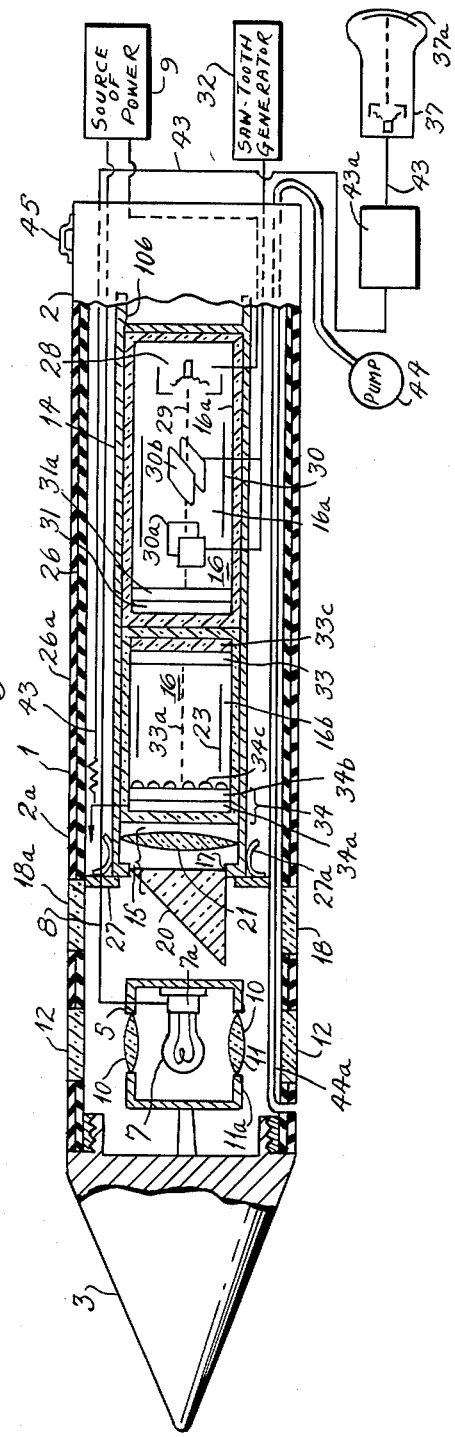
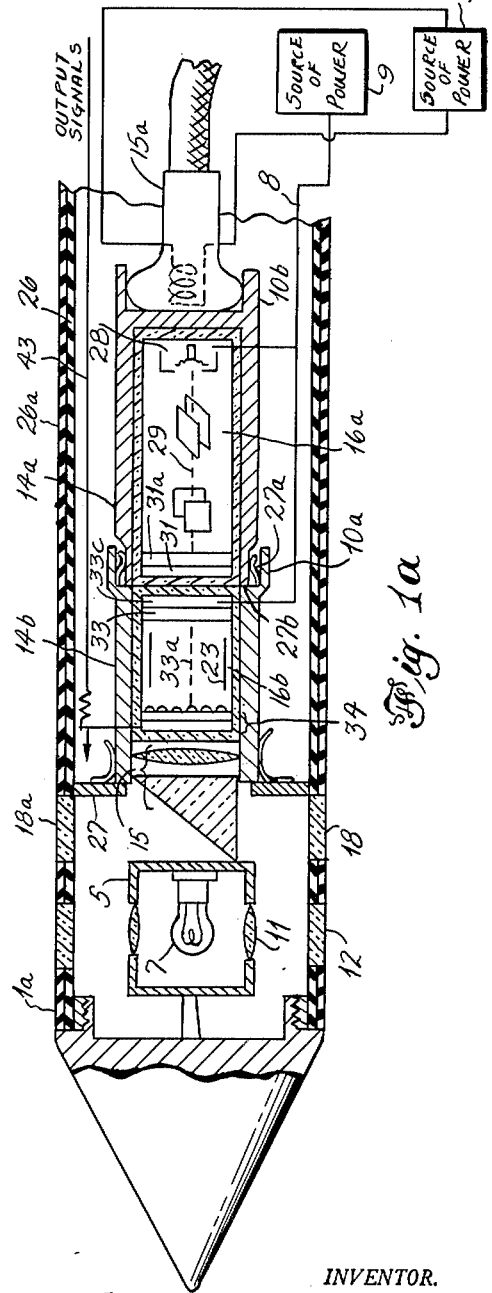
INVENTOR.
EDWARD EMANUEL SHELDON
BY
L. S. Saulsbury
ATTORNEY

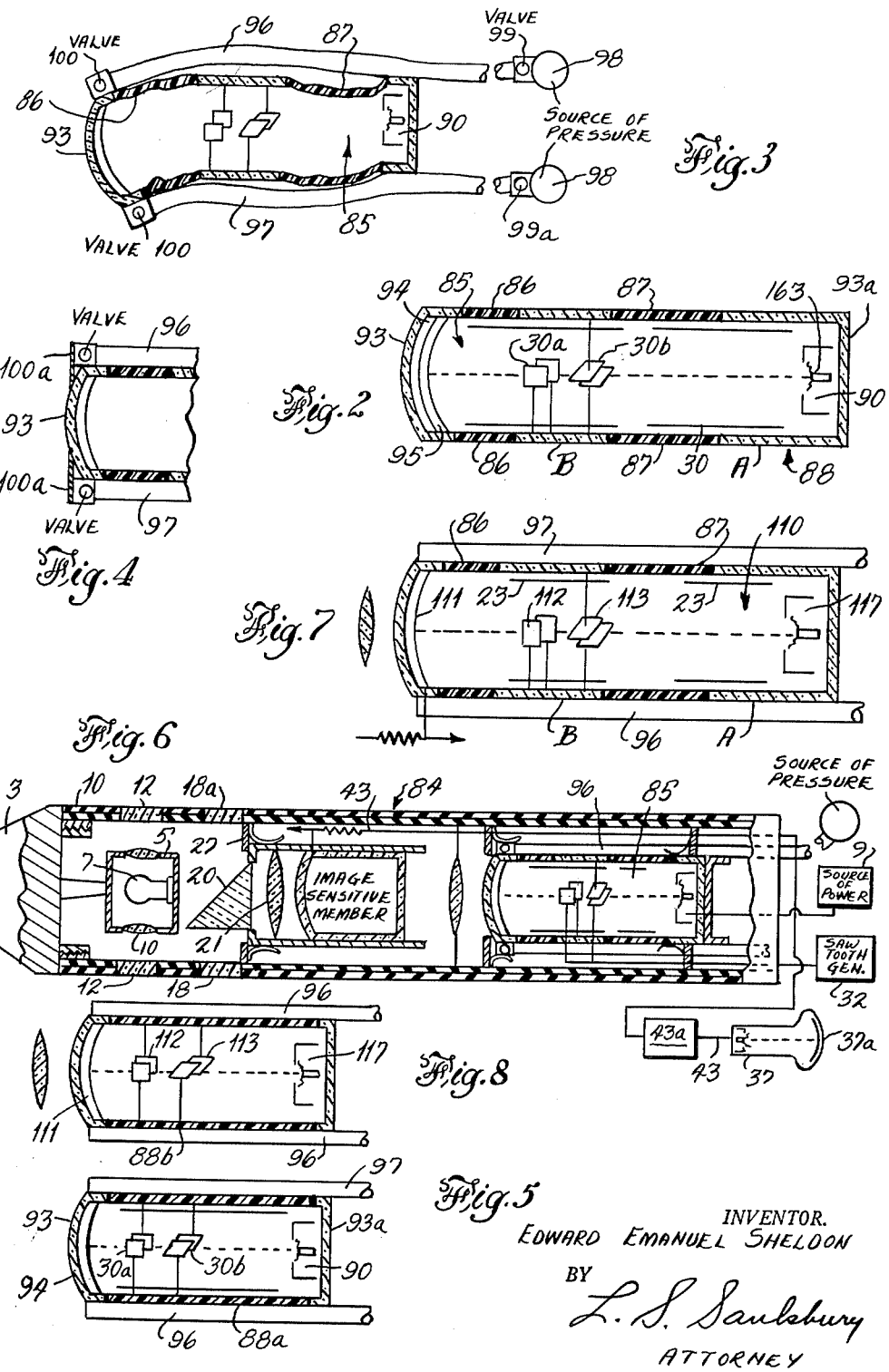

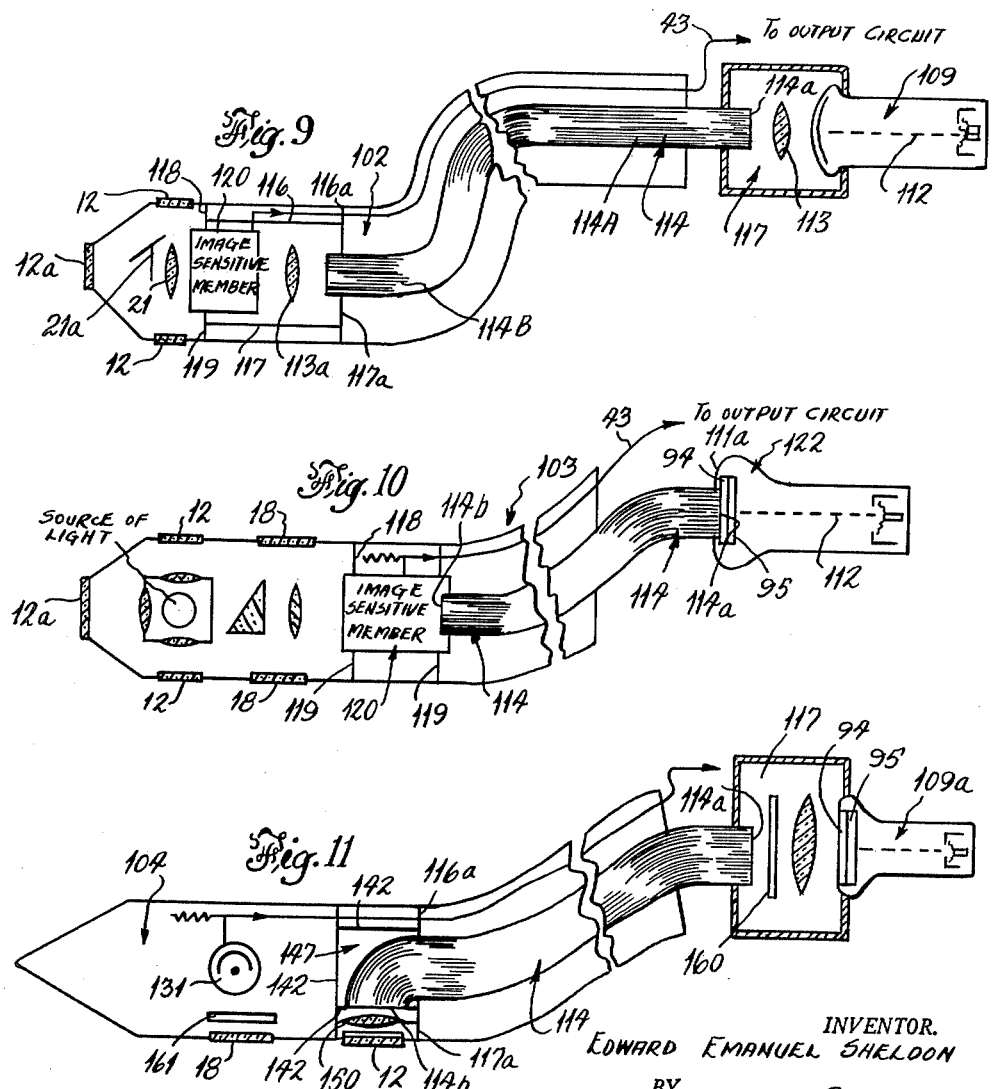

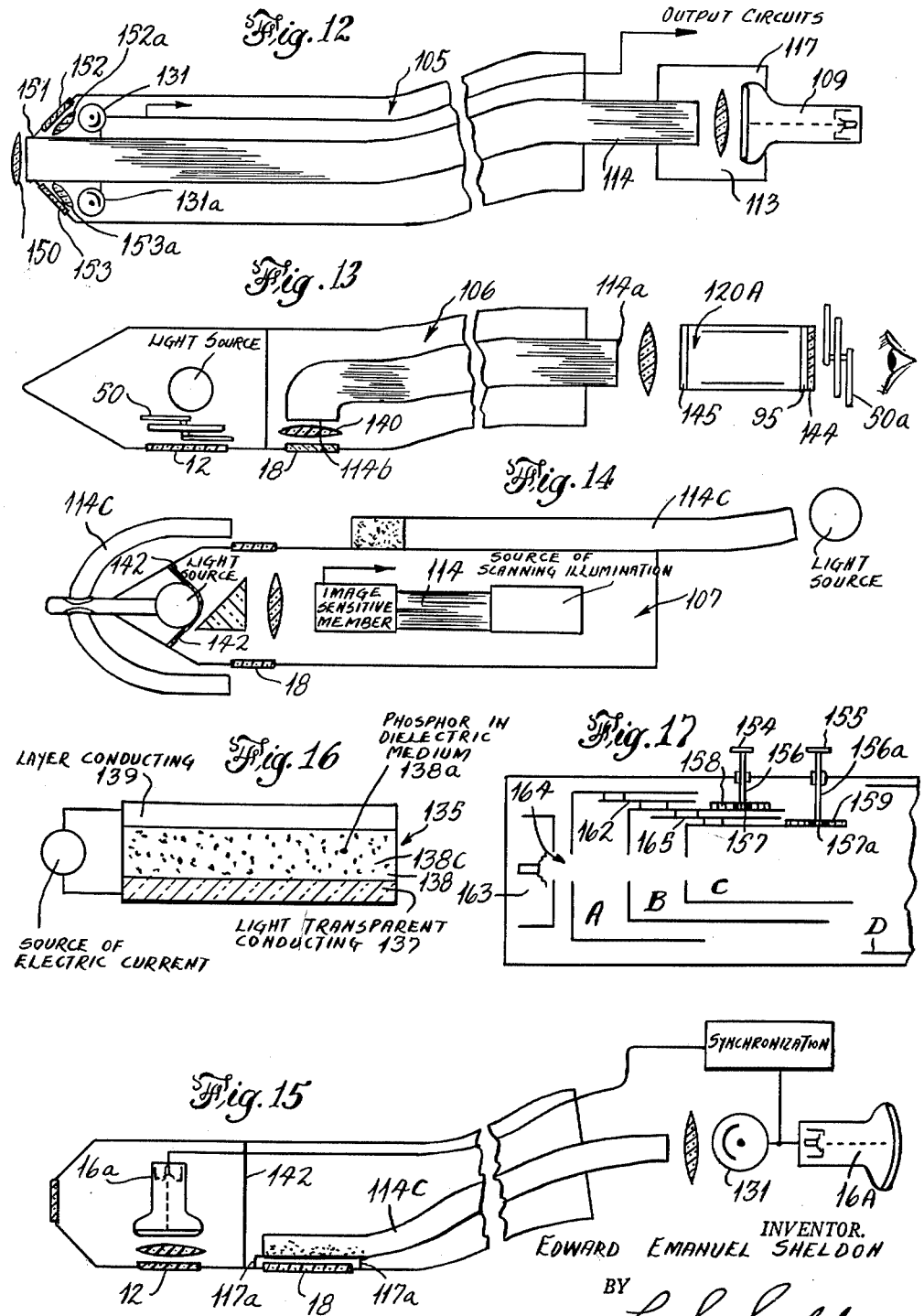

United States Patent Office 3,021,834
Patented Feb. 20, 1962

3,021,834
ENDOSCOPES
Edward Emanuel Sheldon, 30 E. 40th St.,
New York, N.Y.
Filed Nov. 28, 1956, Ser. No. 624,829
9 Claims. (Cl. 128—6)

This invention relates to a novel endoscopic instrument i.e. instrument for examination of the internal organs of the body such as gastrointestinal tract including oesophagus, stomach, intestine, small and large, rectum, pulmonary tract including trachea, bronchi, urinary tract or peritoneal and pleural cavities and has a common subject matter with my U.S. Patents No. 2,764,148, filed July 11, 1950, and No. 2,764,149, filed May 23, 1951. In addition this application is a continuation-in-part of my U.S. Patent 2,877,368, filed March 11, 1954, and issued on March 10, 1959. The present endoscopic devices consist of straight tubes which are either hollow or are provided with lenses or prisms. Due to inability of light to see around the corners, the present endoscopes have to be absolutely straight and rigid so that the eye of the examiner and the examined part of the patient's body are in one straight line. The endoscopes using optical lenses or prisms do not improve this situation as the shape and the size of the examined organs is so variable that the position of the curves and angles of the organs is absolutely unpredictable and therefore the lenses or prisms cannot be positioned to anticipate these multiple deviations of the axis of the examined organ from the straight line.

The purpose of my invention is to provide a method and device for visual examination of the internal organs regardless of their size and shape and of the angle of their curvatures which was impossible until now and represents therefore an important process in medical diagnosis.

Another purpose of this invention is to provide means for introduction of the endoscopic instrument into a patient's body under constant visual control which is the most important factor in the safety or performance of endoscopic examination.

Another purpose of my invention is to enable simultaneous observation by many examiners, in close or remote locations, which was not possible until now. This is of great importance as the endoscopic procedures being extremely strenuous for the patient have to be performed very fast so that there is no time available for other examiners to inspect the examined field.

Another purpose of my invention is to provide means for simultaneous visual inspection, and photographic recording of the examined organ which also has never been possible before.

Another purpose of this invention is to provide means for inspection of inaccessible channels, such as hollow parts of machinery or of other inaccessible tortuous passages. My device may be introduced inside of a part which cannot be inspected visually without dismantling or destroying the whole machine and will transmit the image of said part to the observer outside of said part. My invention will be especially useful for the examination of coils and pipes or other curved structures. My device can be also used as a probe to be inserted into a solid object and to transmit information about its internal structure.

Another objective of my invention is to intensify the image of the examined internal parts or passages so that the final image will be presented to the observer with the luminosity facilitating inspection of said image.

Another objective of this invention is to change, decrease or amplify the contrast of the image of the examined part.

The objectives of my invention are realized by a novel device which is flexible to allow its introduction into the examined part regardless of its curvatures or angulations and which after its introduction into the examined part will produce a light image of said part. Video signals are reconverted in receivers outside of the examined part into visible images for inspection or recording. My intrascopic device can produce black and white images, as well as multi-color images, showing faithfully or arbitrarily the colors of the examined part.

In particular this novel device besides other inventive features makes use of a television pick-up tube consisting of two separate independent elements which can be introduced separately into the examined part and which after introduction work in cooperation as a television camera. As each of these two separate elements is smaller in size than any conventional television camera can be made, this novel television camera can be introduced into locations which, because of small size or tortuous shape of passages leading to them, were inaccessible to the most miniaturized television cameras known in the art.

Another marked improvement in my novel television camera is elimination of magnetic deflecting and focusing coils which are bulky and occupy so much space that even a small television tube using them cannot be introduced into narrow passages. The use of conventional electrostatic deflecting system results in a marked distortion of images especially in pick-up tubes using the slow scanning electron beam. These drawbacks are eliminated in my intrascope and therefore in spite of its very small size it is capable of producing images of a good definition and contrast.

In the drawings:

FIG. 1 represents a partially sectioned view of the novel instrument for inspection of inaccessible parts;

FIG. 1a shows a modification of the intrascope;

FIG. 2 shows a novel flexible flying spot tube;

FIGS. 3, 4, and 5 show modifications of the flexible flying spot tube;

FIG. 6 shows a modification of the endoscope having flexible vacuum tube;

FIGS. 7 and 8 show a novel flexible television pick-up tube;

FIGS. 9, 10 and 11 show a novel endoscope having image conductor;

FIGS. 12, 13, 14 and 15 show modifications of the novel endoscope with image conductor;

FIG. 16 shows a novel flexible light source;

FIG. 17 shows a novel vacuum tube having a telescopic electron gun.

This new device which may be called the intrascope or endoscope 1 is shown in FIG. 1. The handle 2 is a hollow tube of diameter corresponding to the examined part. The handle may be rigid or semi-flexible or completely flexible according to the part to be examined. At the end of the handle begins the flexible part 2a of the intrascope which also has width and length suitable for the size of the examined part. In case the intrascope is used for examination of fragile parts, the part 2a must be very flexible and pliable in order to avoid damage to the wall of the examined part. The basic feature of the material for the flexible part of the intrascope is therefore that it must be easily bent and molded by the walls of the passages in which it is being introduced. Such material may be rubber 26 or a suitable plastic, of the type used by Davol Rubber Company of Providence, Rhode Island. In case the intrascope is used for investigation of sturdy parts or of machinery, the part 2a may be more rigid. The flexible part 2a of the intrascope may be made of the stainless steel spiral sheet designed not only for durability but also to maintain the proper degree of flexibility and elasticity. The metal spiral is tapered to insure its uniform bending. The intrascope may be covered with an outer tubing 26a such as of neoprene. This prevents dust particles and moisture from affecting the optical and pick-up system located inside of the intrascope. At the end of the flexible part there is a semi-flexible tip 3 which may be screwed on the flexible part and can be easily removed giving thereby access to the inner structures of the intrascope. The tip consists of a rubber conical finger and serves to facilitate the gliding of the intrascope within the examined part. In order tn facilitate the introduction of the intrascope into parts which have no curves, my device can be made semi-rigid by inserting into it a semi-rigid stilet. In case the intrascope is used as a probe for insertion into a solid object, the tip 3 should preferably be rigid and sharply pointed to be able to pierce the examined object. In some cases the tip is provided with one or more windows at its end to transmit the light to the examined part and to receive the image of said part. The tip may also have a hemi-spherical or other shape.

In some cases the examined part has to be distended by air or fluid insufflation prior to the examination. A special air pump attachment 44 and a channel 44a in the intrascope is provided for this purpose. The channel 44a may also serve to evacuate contents of the examined part before examination to improve visibility. The knob 45 on the proximal end of the intrascope serves to indicate the examiner the position of windows 12 and 18 of the intrascope. In examination of living bodies, the layer 26 or 26a should be of a highly dielectric material to prevent any short circuits.

In the distal end of the flexible part of the intrascope there is a housing box 5 containing the illumination system 7. The box 5 may also be attached to the inner walls of the intrascope by means of the brackets or may be held by springs. It is obvious that there are many means for attachment of the box 5 which are well known in the art. All walls of the housing box 5 except the one facing the television pick-up tube 16 are provided with windows 10 for transmission of the light from the illuminating system 7. These windows are correlated with the windows 12 in the flexible part of the intrascope which transmit the light from the illuminating system to the examined part. In some cases the windows 12 may be made to extend over the circumference of the intrascope. In some cases the window to transmit illumination from the light source to the examined part may also be provided in the distal end of the intrascope instead of being in its side walls, and in such case the tip may be made of transparent material or may be omitted. Windows 12 may be provided with shutters which can be controlled from the proximal end of the intrascope which is outside of the examined part.

The illuminating system may consist of the electrical bulb 7. The electrical bulb may be mounted in the housing box 5 by means of a socket 7a. In some cases it is advantageous to use the objective lens 11 between the light bulb and window 12 in order to concentrate the light on one field. The lens may be held in position by brackets 11a. The light bulb is activated by the source of electrical power 9 situated outside of the examined part. Such a source may be the commercial electrical current or battery of dry cells. The flexible electrical cable 8 leads from the socket 7a to said outside source of electrical current 9. The cable is a lacquered, double insulated electric wire, is covered in addition with liquid rubber and is vulcanized in order to prevent a short circuit. The housing unit 5 may be in some cases omitted and the light source may be attached to the socket 7a which is held by brackets. In some cases electrical power of very high frequency is preferable.

In the flexible part 2a proximally to the housing box 5, there is a rigid non-transparent housing compartment 14 containing the optical system 15 and the novel television pick-up tubes 16a and 16b. The housing 14 has an opening 17 in which the optical system 15 is lodged and which serves to admit the image of the examined part. This opening is correlated with windows 18 in the flexible part of the intrascope which transmit the image of the examined part. In some cases the windows 18 may be made to extend over all the circumference of the intrascope. The windows 18 may be provided with shutters operated from the proximal end of the intrascope which is external to the area of to the examined part. The housing 14 containing the television pick-up tubes 16a and 16b and the optical system may be attached to the inner wall of the flexible part 2a of the intrascope by means of brackets or may be held by springs 27a. As the housing box fits into the encasing holding member 26 and is held by it tightly, in some cases no additional supporting means such as springs are necessary.

The optical system 15 may consist of 90° gable prism 20 and the lens 21. The optical system may have its own housing unit instead of being lodged in the compartment 14 and may then be introduced into the intrascope separately.

In some cases it is desirable to have a large field of vision and at the same time to preserve the necessary magnification of the examined part. In such a case, instead of the prism 20, a rotating mirror should be used. The mirror has a first surface coating which eliminates the reflections and is activated by the magnetic solenoid placed beneath the mirror. The solenoid is connected by the elastic cable with the controls outside of the examined part and can tip the mirror from the retrograde position to the forward position, giving thereby an additional field of vision without the necessity of moving the intrascope. The image of the examined part is reflected by the mirror on the objective lens which focuses said image on the photocathode of the novel television pick-up tube 16b described below. In case the magnification of the examined part is not necessary a large field of vision can be obtained by using the lens providing 80° field of vision instead of the usual 45–50°. The image produced by the optical system is inverted but it can be reverted to the original position either by an additional lens or electron-optically in the viewing tube. The rotating mirror may also serve to admit image either through window 18 or 18a without rotating the whole camera 16.

The housing box 14 contains the novel miniature television camera 16 which was designed to reduce to the minimum the size of the television camera. The television pick-up tubes known previously in the art could be miniaturized only to a certain degree, which was not sufficient in certain applications as some of the examined parts are too small to allow the introduction even of the smallest conventional pick-up tube. This is true especially for the type of tubes having external deflecting coils such as of magnetic or electro-magnetic type, and in such situations, my novel camera 16 will be very suitable as it does not require any external deflecting or focusing coils at all. The camera 16 consists of two vacuum tubes 16a and 16b. The tube 16a has an electron gun 28 which produces an electron beam 29. The electron beam 29 is focused by electrostatic field 30. The electron-optical system for focusing the electron beam 29 may be simplified and markedly reduced in length by using the unipotential electrostatic lens instead of the usual two-lens system. The electron beam 29 is deflected by electrostatic plates 30a and 30b in two perpendicular to each other planes. The electrostatic plates are energized by signals from saw-tooth generators 32 which are situated outside of the examined part. The generators 32 are connected with electrostatic plates 30a and 30b by means of flexible wires. One deflecting field is produced by the horizontal deflection plates 30a and may have line frequency such as 5–15,000 cycles per second. Another deflecting field is provided by the vertical deflection plates 30b and may have field frequency such as 15–60 cycles per second. In this way the electron beam 29 is made to scan the fluorescent screen 31 in a regular television raster. The fluorescent screen 31 may be in some cases provided with electron-transparent metallic conducting backing layer 31a such as of aluminum. The fluorescent screen 31 must be of a phosphor of a very short persistence in order to obtain a good resolution of the image. ZnO has decay time of 1 micro-second and is suitable for this purpose. Still better results may be obtained by means of ZnS phosphor and using only ultra-violet component of its fluorescent emission which has decay time of $1/10$ micro-second. In some cases, it is preferable to make the fluorescent screen 31 of semi-spherical curved shape as it will improve definition of the flying light spot. The fluorescent layer 31 may also be deposited on a supporting mesh screen instead of being deposited on the wall of the vacuum tube. This will improve definition of the flying light spot.

The vacuum tube 16a operates in combination with the vacuum tube 16b forming together the novel television camera 16. The vacuum tube 16b has a photoemissive electrode 33 which may be deposited or attached to one of the walls of said vacuum tube. In some cases it is preferable to provide a light transparent conducting layer 33, such as of material known in the trade as "Nesa," or of compounds of tin or of cadmium, on the side of said photoemissive electrode 33 facing the fluorescent screen 31. Such a layer must be very thin, e.g., of the order of microns in order not to impair the definition of images produced by the novel pick-up tube. The photoemissive electrode 33 may be of CsOAg or of caesium, sodium, lithium or rubidium on antimony, arsenic or bismuth, or of a mixture of aforesaid elements. At the opposite end of the vacuum tube 16b there is provided a photocathode 34 which consists of a light transparent signal plate 34a, a light transparent insulating layer 34b and a photoemissive mosaic 34c. The signal plate 34a may be a thin transparent layer of metal or other conducting material. The insulating layer 34b may be of mica, silica, or other transparent dielectric material and photoemissive mosaic 34c may be of CsOAg or of caesium, rubidium, potassium or lithium on antimony, arsenic or bismuth, or of a mixture of aforesaid elements. In some cases the photoemissive layer 34c may be, instead of a mosaic, also of continuous type. In cases in which electrostatic focusing field 23 is used to focus the scanning electron beam 33a on the mosaic 34c, much better resolution will be obtained by making such mosaic of a curved semispherical shape. In addition, the use of such spherically shaped photocathode will eliminate instability of the image which is very marked when using electrostatic fields for focusing a slow electron beam.

The light image of the examined part is projected by the optical system on the photocathode 34 of the vacuum tube 16b. The light image produces emission of photoelectrons from the layer 34c. As a result, a positive charge image having the pattern of said light image is left on the photoemissive mosaic 34c. Both vacuum tubes 16a and 16b are held in apposition to each other and in such a manner that the fluorescent screen 31 of the vacuum tube 16a is adjacent to the photoemissive electrode 33 of the tube 16b. The scanning electron beam 29 impinging on the fluorescent screen 31 produces a light spot at each point of its impingement. The scanning illumination excites the photoemissive electrode 33 and produces thereby a fine scanning beam of photoelectrons 33a. The photoelectron beam 33a is of the scanning type because it is produced by the scanning electron beam 29. The photoelectron beam 33a may be further focused by electrostatic fields 23. In this construction it is preferable to use focusing fields because the separation of the fluorescent screen 31 from the photoemissive electrode 33 by the thickness of the wall of the vacuum tubes 16 and 16b causes certain unsharpness of the photoelectron beam 33. The electron beam 33a may be of high velocity such as used in the iconoscope type of television pick-up tubes or may be of a slow velocity. In this embodiment of my invention, I use the slow scanning electron beam. It is to be understood, however, that the fast scanning electron beam may be used in my invention as well. The electron beam 33a scanning across the charge image stored in the mosaic 34c converts said image into electrical signals which appear at the signal plate 34a. These electrical signals can be converted into video signals over the resistance in the manner well known in the art. The video signals are transmitted by the flexible coaxial cable 43 from the intrascope within the examined part to the video amplifiers 43a outside of said part. The amplified signals are transmitted from the amplifiers to the viewing tube of kinescope type 37 and are reconstructed therein into the visible image representing the image of the examined part. The viewing tube may be of kinescope type and does not have to be described in detail as it is well known in the art. The examined part will appear on the fluorescent screen 37a of the viewing tube where it can be inspected by many examiners. Transmission of the image from the amplifier 43a to the viewing tube can be done by coaxial cable 43 or by high frequency waves. The image can be sent, therefore, not only to the immediate but also to the remote receivers or may be transmitted to multiple independent viewing tubes for the benefit of many examiners, which was one of the objectives of this invention. The image on the viewing tube 37 may also be photographed simultaneously with the intrascopic examination in order to make a permanent record, which was another purpose of this invention. It should be understood that the electrical signals from the pick-up tube may be fed into various utilization circuits instead of into image-reproducing receivers.

The contrast of the reproduced image may be changed, diminished or increased according to the needs of particular examination by using amplifiers provided with variable mu tubes, or by the use of kinescope in which gamma can be controlled. The signal to noise ratio of this system and therefore the definition of the reproduced image may be improved by using in amplifiers discriminating circuits which reject signals below the predetermined amplitude and eliminate therefore most of the noise signals. The coaxial cable 43 within the examined part may be encased in the above-described means 26 or 26a for inserting intrascope or may be attached to them.

The voltages for the operation of the tubes 16a and 16b are supplied through the flexible electrical wires 8a from the source of the electrical power 9 outside of the examined part. In the same way the horizontal and vertical synchronizing circuits, focusing fields and deflecting circuits are supplied with electrical energy from the outside source of power 9. The synchronizing circuits are not described in detail as they are well known in the art and it is believed they would only complicate the drawings. In some cases the coaxial cable may be outside of said inserting means 26 or 26a.

In some examinations the television endoscope or intrascopes described above are still too bulky to be introduced into narrow passages or cavities. For such cases I devised a novel intrascope in which one or all of the vacuum tubes used in the intrascopes, such as television pick-up tube or image-sensitive tube or flying spot tube, also known as a kinescope tube, are constructed in such a manner that all of their sidewalls or a part of their sidewalls or their endwalls are flexible to conform to the tortuous configuration of the passages.

Reference is now made to FIG. 2, which illustrates one of the embodiments of this invention. In this embodiment the novel flying spot kinescope 85 has flexible portions 86 and 87 in the sidewalls 88. The tube 85 has section A which houses the electron gun 90 and which is of a rigid material, such as glass, metal or a ceramic. Also the section B which houses two pairs of deflection plates 30a and 30b is of rigid material, such as glass, metal or ceramic. The endwalls 93 and 93a may also be of rigid material, such as glass, metal or ceramic. The fluorescent screen 94 with a metallic electron pervious backing layer 95 are deposited on the endwall 93. In some cases the backing layer 95, preferably may be omitted. Between the section A and the section B, the sidewall 88 has the flexible section 87. Between the section B and the endwall 93 is mounted another flexible section 86. The sections 86 and 87 are made of a flexible material which has malleability to conform to configuration of examined part. I found that the flexible sections 86 and 87 may be made of a plastic material, such as of one of fluorocarbons. In particular, I found that tetra-fluoroethylene or its derivatives, such as Teflon made by Du Pont Company of Wilmington, Delaware, are suitable for this purpose. I also found that polyesters, such as Mylar or Cronar manufactured by Du Pont Company of Wilmington, Delaware, may be used for this purpose. In addition, silicone plastics, such as Silastic, made by Dow-Corning and isocyanate plastics, such as Eccosorb AN made by Emerson and Cumming, may be useful. I discovered that these plastic materials, with the exception of tetra-fluoroethylene, are slightly pervious to the air and as a result they do not maintain well vacuum in the tubes. I found, however, that this difficulty could be overcome by metallizing, such plastic materials, with a thin layer of aluminum or other metals. This metallization will not impair the flexible nature of the above described materials. It should be added that ordinary rubbers proved to be unsatisfactory for this purpose.

The flexible sections 86 and 87 are fused to the adjacent rigid parts by means of Kovar seals or by bonding them with heat resistant glues, such as "Ardalit," manufactured by Ciba Company, or preferably with Du Pont Fabrics and Finishes Department's adhesives 4684 and 4695. When using 4695 to adhere to a polyester, such as "Mylar" to the glass, the adhesive should be coated on polyester, solvents evaporated, then combined with glass at 350° F., followed sometimes by an additional 10 minutes curing at 350° F. When adhering polyesters to a metal, such as aluminum, copper, brass or steel, the above described procedure may be followed as well. The resulting bond was found to withstand flexion well. The presence of flexible sections 86 and 87 will allow the vacuum tube to conform to configuration of the passages through which the endoscope has to pass to enter the examined part. In many examinations, especially in the human body, the main difficulty resides in constricted passages which lead to the examined organ. For example, the stomach has ample room to accommodate the endoscope, but the esophagus at the junction with the stomach forms a sharp anterior angulation which has a small diameter and which can accommodate only a small rigid object. The rigid part of tube 85 is now only the electron gun which can be made small enough for the passage through the esophagus or other narrow passages. The only other rigid parts of the tube 85 are the deflecting plates 30a and 30b, which are small per se and which, furthermore, being separated from the electron gun by the flexible part 87 of the tube do not contribute any more to the length of the rigid portion of the tube.

The novel endoscope 84, shown in FIG. 6, is provided with a vacuum tube having flexible walls 86 and 87 will now be able to pass in all patients through the esophagus into the stomach, as such a vacuum tube used in my device will be able to conform to the shape of the esophagus.

The tube 85, after the passage through the esophagus, or any other similar narrow passages, will be distorted in shape and will, therefore, not be able to function. For example, the electron beam from the electron gun 90 may now be directed to the sidewall 88 of the tube instead of to the fluorescent screen 94, as shown in FIG. 9a. In order to reestablish the original shape of the vacuum tube, which is essential for its operation, I use two flexible conduits 96 and 97, which are attached to the sidewalls of the vacuum tube and to the distal endwall 93 of said vacuum tube. In some cases they should be attached also to rigid section B.

The conduits 96 and 97 may be of flexible materials, such as were described above. The conduits 96 and 97 extend beyond the vacuum tube to the outside of the examined part and are connected to a source 98 of compressed air, oxygen or liquid. This source 98 is disposed outside of the examined part. When the endoscope is in the location in which there is enough space for vacuum tube to reestablish its normal configuration, the valve 99 which controls the passage of the air is opened and the pressure of the compressed air will cause straightening of the bent tube 85. Instead of the air or oxygen also a fluid under pressure may be used as well. The use of pneumatic or hydraulic means to reestablish the proper configuration of the vacuum tube represents an important feature of my invention as otherwise the whole endoscope would fail to operate. The conduits 96 and 97 are in addition provided with a valve 100 controlled openings at the distal end to provide insufflation of air or liquid into examined cavity as it may be necessary in some examinations. The valve 100 serves also as a safety outlet in case the return of fluid or air from the conduits 96 or 97 should fail. In such an accident the endoscope could not be withdrawn from the patient's body as the vacuum tube 88 would not be able to fold and to conform to the configuration of passages. By opening the valve 100, the escape of fluid or air is provided which will reestablish flexibility and malleability of the vacuum tube 85.

In some cases in which the geometric configuration of the tube is not very critical, instead of flexible conduits 96 and 97, used to reestablish the original shape of the tube, we may use flexible sections 86 and 87 made of a resilient material, which will by itself revert to the original form after the pressure by the walls of the passage is removed. I found that materials, such as silicone rubbers, manufactured by Dow-Corning Co. are suitable for this purpose.

I found that when using fluorocarbons as a plastic material for flexible sections 86 and 87, a complication arises due to escape of negative fluorine ions during the baking of the tube. These negative ions cause a fast deterioration of the fluorescent screen or of the photocathode. I found that this difficulty could be solved by providing a flexible conducting grid opposite the flexible sections 86 and 87 and which is connected to the source of a positive electrical potential during the baking of the tube and which intercepts the negative ions, or by metallizing the inner surface of plastic material by deposition of a layer of aluminum.

It should be added that the baking of the vacuum tubes having flexible sections should be preferably done at temperatures below 150° C.

The flexible conduits in some cases may be preferably attached to light transparent extensions 100a mounted on the sides of the endwall of the vacuum tube instead of being attached directly to the endwall of the vacuum tube, as shown in FIG. 4.

In some cases it is preferable to make the whole sidewall 88a of the vacuum tube 85 flexible instead of having a combination of rigid and flexible sections as was described above. In such case the electron gun is mounted on the endwall 93a of the tube which is of rigid material. This construction is shown in FIG. 5. In other cases it is necessary to make the endwall of the tube of a flexible material or to insert a flexible section into said endwall. The flexible endwall may be used in combination with a flexible sidewall or with a rigid sidewall.

It should be furthermore understood that the flexible construction of the electron tubes applies also to non-vacuum tubes, such as gas tubes, like Geiger-Müller tubes, proportional counters, ionization chambers, etc.

In some cases the pressure source 98 should be preferably located within the examined body or examined part. The pressure source 98 may be located within the endoscope or outside of endoscope. In some cases, instead of pneumatic or hydraulic means, mechanical means, such as springs or telescoping rods may be used to reestablish the shape of vacuum tube 85.

It should be furthermore understood that the novel construction of the vacuum tube described above applies not only to the kinescope type of tubes but also to all types of television pick-up tubes, one of which is illustrated in FIG. 7, or to all image sensitive vacuum tubes described in this specification.

The novel pick-up tube 110 may be of photoemissive type, photoconductive type or photovoltaic type. Suitable materials for photoemissive photocathodes are CsOAg or CsSb or other metal alkali, such as K, Na or Rb with Sb, As, or Bi.

Suitable photoconductive materials are selenium or its compounds, sulphides of lead, cadmium or tellurium, oxides such as lead oxide or zinc oxide, antimonides, especially indium antimonide. It should be understood that all these materials may be used as evaporated layers, sintered layers, mosaic layers, layers embedded in plastic, single crystals or a mosaic of crystals.

In addition, the television pick-up tube 110 may have an image sensitive screen which combines both photoemissive and photoconductive layers. The photocathodes or screens 111 may be of continuous type or of mosaic type. The photocathodes or screens 111 may have a planar shape or may be preferably of convex shape. The scanning electron beam may be of high velocity type or of a low velocity type. In conclusion, it should be understood that all types of television pick-up tubes or of image sensitive tubes come within the scope of this invention.

The novel endoscope 84 having flexible vacuum tube 85 is shown in FIG. 6. It should be understood that the image sensitive element 16b or any of its modifications described in this specification could be constructed with partially or totally flexible sidewalls, as was described above. The remaining parts of the endoscope 84 may have construction illustrated in FIGS. 1 to 8. The image sensitive member and tube 85 may be in contact with each other.

The novel pick-up tube 110 has the photocathode 111, the deflecting plates 112 and 113 and the electron gun 117 for producing the scanning electron beam and electrostatic focusing means 23, as is well known in the television art. In addition the novel pick-up tube 110 has flexible sections 86 and 87 in the sidewalls which were described in detail above. Besides the novel pick-up tube 110 has flexible conduits 96 and 97 connected to an extraneous source of compressed gas or liquid, as was described above.

It should be understood that the novel pick-up tube 110 may have the whole sidewall 88b made of a flexible material, as was described above, and as it is shown in FIG. 8. The use of a flexible television pick-up tube 110 in the endoscope may be in some cases preferable to the use of a television system composed of two separate elements, as described above.

In another embodiment of invention, illustrated in FIG. 9, the kinescope 109 which produces the flying spot illumination of the image sensitive member 120, which may have construction of tube 16b or 16B' or 16C, or of screen 127, or of any modifications thereof, is disposed outside of the examined part and has, therefore, no limitations any longer as to its size or flexibility. The kinescope 109 has a similar construction as the flying spot kinescope 16a described above. It should be understood, however, that it can be now of magnetic or electrostatic type as it is not limited any more as to size. The flying spot light produced by the electron beam 112 is projected by a suitable optical system 113 on a flexible novel light conductor 114.

The image conductor 114 consists of multiple fibers of material having a high refractive index such as quartz, rutile or special plastics. In many applications the image conductor must be flexible and easily malleable. In such cases, acrylic plastics, such as Lucite or polystyrenes may be used. Especially Lucite is suitable for this purpose because it causes smaller losses of conducted light than other materials. Lucite and other above-mentioned materials characterized by a high refractive index have the property of internal reflection of the light conducted by them. Such materials cannot conduct a whole image as such but they can conduct well a light signal, which means an image point. The size of the image point I found is determined by the diameter of a single conducting fiber 114A. In my image conductor I assembled a bundle of such fibers which form a mosaic-like end-faces and which, therefore, can conduct plurality of image points. All these image points will reproduce at the other end-face of the image conductor the original image, provided that the ends of image conducting fibers remain in their original spatial relationship. Each fiber 114A should have, as was explained above, a diameter corresponding to the size of one image point. The diameter of 0.1 millimeter is well suitable for the purposes of my invention. In order to conduct an image of an area, e.g., of one square centimeter, we must have many fibers, the number of fibers being dependent on the resolution of reproduced image that we desire. If the resolution of the conducted image should be four lines per millimeter, and if the image is of one square centimeter in size, we will need 40 fibers of 0.25 millimeter in diameter. The light conducting fibers should be polished on their external surface very exactly. Each of them must also be coated with a very thin light opaque layer 114B to prevent spreading of light from one fiber to another. I found that without said light-impervious coating, the image will be destroyed by leakage of light from one tube to another. The light opaqued layer should have a lower index of refraction than the light conducting fiber itself. Such a coating may have a thickness of only a few microns. I found a great improvement of flexibility of the light conductor 114 can be obtained by having the light conducting fibers 114A glued together only at their end-faces 114a and 114b. This is a very important feature of my device because the main requirement from the light conductor 114 is its flexibility and malleability. If the fibers 114A are glued together along their entire length, the flexibility and malleability is so much reduced that it may not be possible to use it in many examinations in which the walls or passages are fragile and may be damaged by a rigid instrument. I found unexpectedly that having the conducting fibers 114A free along their path between the end-faces will not cause any deterioration of the conducted image. I found that in spite of the fact that fibers between their end-surfaces were freely movable, there was no blurring of the conducted image. It must be understood, however, that the fibers 114A at both end-faces of the conductor 114 must rigidly maintain their spatial relationship. Another important feature of this construction is that the diameter of the light conductor 114 can be now increased because no space consuming binder or glue is present between the fibers 114A except at their end-faces. Instead of using the binder at the end-faces of fibers 114A, they may also be held together at their end-faces by a fine mesh screen. Each fiber is threaded through one opening of said mesh screen and is being held by said screen in constant position. It may be added that smaller loss of light may be obtained if the fibers 114A are hollow inside instead of being solid.

The number of fibers that can be used in many examinations will be limited by the diameter of the passages through which my intrascope has to pass. As in many situations, the channel may be only 1–2 cm. wide, it will be impossible to use a great number of fibers or a single rod of a large diameter. I succeeded in overcoming this limitation by using in combination the light conductor 114 with a demagnifying optical system 140. By the use of the demagnifying optical system I can reduce the examined field to the diameter of the image conductor 114. If the optical system will demagnify the image five times, I can examine the field having 25 cm.² with the image conductor having the diameter of only 1 cm.². This combination of a light conductor with an optical system represents a very important feature of my invention, as it is not always practical or feasible to limit the examined field only to the diameter of the image conductor.

The light image conductor 114 may be introduced into examined part simultaneously with the intrascope. In some cases it is preferable to introduce my intrascope first and then insert the image conductor into intrascope. In some cases the optical system 113 or 140 may be attached to the end-face 114b of the image conductor to make one unit.

In some cases it is possible to use a light conductor 114 which consists of a single large rod instead of plural fibers 114A, as was described above. The material for the "single rod conductor" may be flexible acrylic plastics, polystyrenes or Lucite. The light conducting rod must be coated with a light-impervious layer 114B of material having a lower index of refraction than the rod itself, such as carbon, graphite or aluminum, except on the surfaces which serve to admit the light or to let the light escape from the conductor. The single rod conductor cannot conduct an image but only successive light signals.

The proximal end 114a of the light conductor 114 must be maintained in a fixed spatial relationship with the flying spot kinescope 109 by mechanical means which may be constructed in the form of a perforated rigid member 117. The light conductor 114 passes through the aperture of said member and is attached thereto. The member 117 is rigidly attached to the kinescope 109 and establishes thereby fixed relationship between the proximal end 114a of conductor and the kinescope 109. The light conductor 114 directs the successive light spots produced by the flying spot kinescope into the endoscope 115. The scanning light spots emerging from the distal end 114b of the conductor 114 are focused by a suitable optical system 113a on the image sensitive member 120. The impingement of scanning illumination converts the electrical pattern which represents the image of the examined part and which is stored in said member 120 into successive electrical signals. The electrical signals are conducted to the outside of the examined part by wires 43 or by printed circuits and are fed into receivers to reproduce the image. In addition, electrical signals may be used to activate various circuits or devices used for industrial sorting and testing. The distal end 114b of the light conductor 114 must also be maintained in a fixed position in relation to the image sensitive member 120, which may be of any type described above, such as tube 16b or 16B' or 16c or screen 127, when the image of the examined part is transmitted. The rigid plates or rods 116 and 117 with rigid extensions 116a and 117a, to which the distal end 114b of the light conductor is attached, serve to maintain the distal end of the light conductor in a fixed position. I found furthermore that the endoscope 102 will not operate properly if the distal end 114b of the light conductor 114 and the image sensitive element 120 are not maintained in a fixed position. The rigid rods 118 and 119 connected to the image pick-up element 120 serve for this purpose. It should be understood that instead of rods, a rigid box, which incloses both the element 120 and the end 114b of the conductor, will provide their immobilization as well. The remaining parts of the endoscope 102 may be the same as described above.

It should be understood that the image sensitive element 120 may have many embodiments, all of which come within the scope of this invention. The pick-up element 120 may have flexible sidewalls, as was described above, in some sections or throughout the whole length of sidewalls. Furthermore, element 120 may have completely rigid sidewalls when used in combination with a light conductor 114. The image pick-up element 120 may be of photoemissive type or may be of photoconductive type or of photovoltaic type and may comprise any material described above.

Another improvement of the endscope is shown in FIG. 10. I found that the loss of light conducted by the conductor 114 becomes very high if the conductor extends over the length of a few feet. It is necessary, therefore, to utilize all the light available from the flying spot kinescope 109. The optical system 113 or 113a in the fastest form still causes a loss of at least 90% of useful light. I found, therefore, that in examinations of remote parts, it was necessary to eliminate the optical system 113 or 113a or both. FIG. 10 shows flying spot kinescope 122, in which all of the endwall 111a or a part of said end-wall is replaced by the light conductor 114, which may be of materials described above, but preferably should be of quartz. The proximal end-face 114a of the conductor 114 may be flush with the rest of the endwall of the kinescope 122 or may extend inside of the kinescope 122. The fluorescent screen 94 is deposited on said end-face 114a. This construction eliminates the optical system and inspite of it, there is no loss of sharpness of the scanning light spot, because of a close apposition of the fluorescent screen 94 and of the light conductor 114.

A similar construction is used in the distal end 114b of the conductor whereby the distal end 114b enters into image sensitive member 120 to establish an optical contact with the image sensitive screen, such as 34, 34A, 34B or 111 disposed in said image sensitive member.

A rotating mirror may be used in addition to a lens to receive the image through various windows. The remaining parts of the endoscope 103 may be the same as described above.

It should be understood that in examinations in which the definition of the image is not important, the image conductor 114 may be placed in contact with the endwall of the flying spot kinescope or with the endwall of the image sensitive member either of television type or of image reproducing type, without penetrating into such a vacuum tube or photocell.

In another embodiment of invention the flying light spot tube is used to produce a scanning illumination of the examined body instead of the scanning illumination of the image sensitive element, as was described above, and is disposed outside of the examined body. This endoscope 104 is shown in FIG. 11. The kinescope 109a may be of any of constructions described above, such as the tube 16a, 109 or 122. The light conductor 114 may be the same as was described above. The flying spot is projected by the optical system 150 onto the examined part.

The optical system 150 is an important feature of this invention. As the diameter of the image conductor 114 is limited by the narrow passages, the field of the examined body, which may be scanned through the image conductor, is necessarily limited. By using, however, an optical system 150, which produces five-fold enlargement, it is possible now to cover the field of the examined part, which is five times larger. This feature proved to be very important in some examinations.

The reflected light spot is admitted through the window 18 to the image sensitive element 131, which in this construction may be in the form of a multiplier phototube. In some cases the solid state photoconductive devices, such as photodiodes or phototransistors, may be used as an image sensitive element instead of a vacuum tube 131. It should be understood that the multiplier phototubes, such as 131, photodiodes or photocells, such as 127, cannot produce an image without the use of a scanning illumination for forming plurality of successive image points.

The use of an ordinary field illumination in combination with phototubes or photocells will produce only signals but not images.

The reflected successive light spots are converted by the element 131 into successive electrical signals. Electrical signals are conducted outside of the examined part and may be reconverted into visible images, as is well known in television art. It should be understood that the electrical signals may be also fed into various utilization circuits provided with "absorption negatives" or other mechanisms used for sorting and testing materials. I found that an essential feature of this embodiment of endoscope is the maintenance of a fixed spatial relationship between the flying spot kinescope 109a and the proximal end 114a of the light conductor 114. The distal end 114b of the light conductor 114 also must be immobilized. The immobilization of the kinescope 109 and of the proximal end 114a of the light conductor was described above. The fixed spatial relationship between the distal end 114b of the light conductor and window 12 may be provided by rigid rods 116a and 117a, or by enclosing the distal end of the light conductor in a rigid light-impervious box, 147.

Furthermore, if no such box is used, there must be provided light-impervious partitions 142 which prevent the light from the light image conductor 114 to reach the image sensitive element 131 before being modulated and reflected by the examined part.

In some cases the flying spot kinescope 109 may be mounted inside of the endoscope or may be introduced inside of the examined body or object but will remain outside of the endoscope.

In some cases the scanning illumination of the examined part is directed through the distal end of the endoscope 105 as it is shown in FIG. 12. The light from the light conductor 114, which may extend beyond the endoscope through the opening 151, is focused on the examined part by the optical system 150. The reflected light is admitted into endoscope through windows 152 or 153 and is focused by lenses 152a or 153a on the image sensitive member 131 or 131a or both.

Another important improvement of all the endoscopes described above is the use of a flexible source of illumination instead of conventional, rigid bulbs or lamps. The flexible light source 135 is illustrated in FIG. 16. The light source 135 comprises fluorescent layer 138, a light transparent conducting layer 137, another light transparent layer conducting layer 139. One of conducting layers 137 and 139 may be light opaque instead of being light transparent. The layers 137 or 139 may be continuous or preferably in the form of a fine mesh or grid. The layers 137 and 139 are connected to an extraneous source of A.-C. or D.-C. electrical potential, preferably, however, of A.-C. type. The electrical potential of 100 volts–1,000 volts and frequency of 50 cycles per second up to 1,000 cycles per second for A.-C. type are sufficient to provide 10-ft. candles of illumination without producing any heat. This feature is of great importance in examination of the living bodies where the heat generated by conventional filament type of bulbs may be injurious to the adjacent tissues. The fluorescent material is embedded in a dielectric medium 138c. This dielectric medium must be of a flexible and light transparent material. Some of materials described above were found very suitable for this purpose. In particular, polyesters, such as Mylar or Cronar, silicones or terephthalates, proved to be suitable for the purposes of this invention.

The luminescent materials used for the layer 138 are sulphides or selenides activated with copper or any other phosphors which have electroluminescent properties. The flexible light source 135 may be made as a thin panel and may be disposed on the sidewalls or on the endwall of the endoscope.

The length of the flying spot kinescope 16a, 85 or 109 or any of its modifications is an important factor in the construction of endoscopes. The rigid part of the flying spot tube is due to the electron gun 28 or 90. Shortening of the electron gun would help therefore to reduce the rigid part of the flying spot tube. In some cases it is possible to image the source 163 of the electron beam on the fluorescent screen instead of imaging the cross-over of the electron beam on the fluorescent screen 31 or 94. This will allow shortening of the electron gun and thereby shortening of the tube 16a or 85 or 109. Also construction of the electron gun known as Wehnelt cylinder will permit reducing of the length of the electron gun. The electrostatic focusing field is provided in Wehnelt cylinder by the electrode adjacent to the filament of the electron gun.

In cases in which a small electron beam is necessary for a good definition of images, it is necessary to use a two-lens electron gun 164, which is shown in FIG. 17. Such a gun comprises filament 163 for emission of electrons, the first focusing electrode A, the first anode B, the second focusing electrode C and the second anode D, which may have the form of a conducting coating on the wall of the tube. This construction results in a longer electron gun than the one described above. In order to shorten this electron gun 164 without sacrificing sharpness of the electron beam, the members C and B are made movable on tracks or slide channels 162 and 165, so that they may be telescoped into each other before the insertion of the endoscope into the examined part. The knobs 154 and 155 serve to move the electrodes B and C. Racks 158 and 159 are secured on the outside wall of electrodes B and C respectively. Pinions 157 and 157a are mounted on shafts 156 and 156a respectively. The shafts 156 and 156a extend beyond the sidewall of the tube and are rotatable by knobs 154 and 155. The telescoping of the electrodes B and C will cause a considerable reduction of the length of the electron gun which was the purpose of this invention.

Another improvement of the endoscope is the use of the flying spot tube, which has instead of the electron gun only an electron emitter. The electron beam produced by the electron emitting source is injected along the edge of the tube and travels to the opposite endwall of said tube which houses the fluorescent screen 94. A plurality of transparent deflecting plates is mounted in front of fluorescent screen 94 and serves to direct the electron beam to successive points on the fluorescent screen to produce thereby a luminescent raster for scanning illumination. This embodiment of invention allows shortening of flying spot tube, which is of great importance to the endoscope.

In some examinations it may be possible to use a conventional source of light in combination with an oscillating mirror, instead of using a flying spot kinescope. The oscillating mirror may be made to vibrate in both horizontal and vertical planes. The oscillating mirror may be mounted on a pivot and may be energized by solenoids through which the current of high frequency is flowing. One set of coils serve to move the mirror in horizontal axis. Another set of coils is vibrating the mirror on vertical axis. The action of both coils makes the mirror oscillate in such a manner that the light reflected by said mirror will scan the area on which it is projected in the same manner as the flying spot which is produced by a cathode-ray tube. The construction of an oscillating mirror is well known in the art and it is believed therefore that its further detailed description will only serve to complicate the drawings. It may be preferable, however, if the oscillating mirror is mounted outside of the examined body to vibrate the mirror only in one plane, such as horizontal plane, and to use an optical drum to produce the vertical scanning displacement of the light spot from the mirror.

It was explained above that the light conductor of a single rod type cannot be used for conducting or transmitting images. I found, however, that it is possible to use a single rod light conductor for transmission of images by a device illustrated in FIG. 15. In this embodiment of invention the source of scanning illumination, such as e.g., the flying spot kinescope 16a or 109 illuminates in a scanning manner the examined part and produces successive image points of the examined part. Each of said image points is projected successively on the single rod light conductor 114C which, as explained above, can conduct only a single light signal, which means a single image point. The successive light signals are fed into phototube 131, which may be disposed inside the examined or outside of the examined part. The phototube is preferably a vacuum tube of multiplier type. In some examinations, a photoconductive photocell or a junction type of a photocell may be used for this purpose. The phototube 131 converts successive light signals into successive electrical signals. The electrical signals are fed into an image reproducing device, such as, e.g., kinescope 16A. The kinescopes 16a and 16A are connected by synchronizing circuits which are well known in the television art. Therefore, each image point produced by kinescope 16a will appear on the fluorescent screen of the kinescope 16A in a proper spatial relationship. If all image points will arrive in a rapid succession and in a proper spatial distribution, I found that a complete image of the examined part will be reproduced in kinescope 16A in spite of using a single rod conductor. The remaining parts of this endoscope may be the same as was described above.

Another advantage of this embodiment resides in discovery that if a single rod conductor has one of its side surfaces exposed, which means abraded and uncoated, it will be able to pick up light signals produced by kinescope 16a along its entire exposed surface. This will solve the problem of examination of large fields, as we will not be limited any more to the field which has the size of the end-face of the light conductor.

In some cases it is preferable to have the image sensitive member outside of the examined body. The endoscope 106 which represents this embodiment of invention is illustrated in FIG. 13. The endoscope 106 has light source, which may be of conventional type, or in the form of a flexible electro-luminescent lamp shown in FIG. 16. The light source illuminates the examined part through window 12. It should be understood that the light source may also be disposed outside of the endoscope and this applies to all embodiments of invention. The image of the examined part is admitted to the endoscope through window 18 and is focused on the image conductor 114 which comprises plurality of light conducting fibers. The conducted image emerges from the conductor 114 outside of the examined part or outside of the examined body and may be viewed by the examiner. In some examinations the emerging image has a very low brightness. It is advisable in such cases to direct the image to the image amplifying tube 120A or to a television camera. The image reproducing tube 120A has a photoelectric photocathode 145 which receives the conducted image and converts into an electron beam 143 and an image reproducing fluorescent screen 144 which reconverts the electron beam into an intensified visible image.

In some cases the end-face of the image conductor should be preferably disposed within the image amplifying tube 120A, or within the television pick-up tube in a similar manner as was described in FIG. 10. This endoscope may be used also for producing color images of the examined part, as was described above. The use of rotating color filters 50 and 50a is one way of producing color images.

In some examinations it is preferable to have the image sensitive member and the source of scanning illumination both to be within the examined part. The endoscope 107, which represents this embodiment of invention, is shown in FIG. 14. The scanning illumination may sometimes be delivered to the image sensitive member by an optical system, but I have found that it is preferable to use the image conductor 114 for this purpose as relative positions of aforesaid members cannot be predicted and optical systems fail.

FIGURE 14 shows a modification of the endoscope in which the illumination is provided by a conventional source of light, such as electrical bulb 7, or by electroluminescent source of light 135. This illumination is piped into the examined part through a flexible conductor 114c. The light conductor is in the form of a single rod as it does not serve to conduct an image but only illumination. The flexible light conductor 114C may be situated inside of the endoscope or outside of the endoscope. If it is outside of the endoscope it may be moved towards the wall of the examined part by shortening the thread or wire attached to its distal end. In this way the light may be brought closer to the examined part or may be even inserted into a narrow channel adjacent to the examined part which is not accessible to the endoscope itself.

It should be understood that the endoscope shown in FIG. 13 may have the image tube 120A or the image sensitive member, such as 16b and its modifications, 120 or 127, or a television pick-up tube disposed inside of the examined body. In such a case the end-face 114a of the image conductor is also within the examined body and may be inside of the endoscope or may be outside of the endoscope. The operation of such device is as follows: the end-face 114b receives the image of the examined part through window 18. The image projected on the end-face 114b may be demagnified by the optical system 140 to reduce the size of the image to the size of cross-section of the image conductor 114. The image emerging at the proximal end-face 114a may be projected on the image sensitive member, such as 16b or its modifications described above, 120 or 127, or on a television pick-up tube, and will be thereby converted into electrical signals, as was described above. The electrical signals may be led to the outside of the examined body by a coaxial cable, as was explained above. The television pick-up tube may be of photoemissive type, photoconductive type, or photovoltaic type, and may use fast or slow scanning electron beam. The novelty of the combination of the image conductor with a television system resides in the ability of the intrascope provided with this combination to penetrate into locations which are inaccessible to television pick-up system. The television pick-up system can then transmit the image to the outside of the examined body and it can do it regardless of the distance between the television tube and the outside. The image conductor on the other hand is limited in its ability to conduct an image for longer distances because of prohibitive loss of light.

I found that in some cases the combination of two different colors of illumination of the examined part allows the production of the image of pathological lesions in a color which was characteristic of a disease, facilitating thereby diagnosis. For this purpose an additional light source may be placed either outside of the endoscope or inside of the endoscope. If it is placed inside of the endoscope it may be piped to the examined part by a flexible light conductor in the form of a single rod 114C, as shown in FIG. 14. The additional light may be a visible color, or it may be an invisible light, such as ultra-violet or infra-red light. It should be understood that all types of endoscopes may serve to produce true or arbitrary color images of the examined part in the manner described above.

Another important discovery was that supersonic waves can also be conducted by the image conductor 114 or 114C. By using as a source of image forming radiation piezoelectric or magnetostrictive generators of supersonic waves and conducting said waves to the examined part, we may produce supersonic images. Piezoelectric generators may be in the form of oscillating crystals of quartz, titanium compounds, such as titanates, Rochelle salts and other similar materials. The piezoelectric or magnetostrictive generators can be disposed within the examined body or may be disposed outside of the examined body. The supersonic waves may be directed to the examined part by supersonic lenses or preferably by means of the image conductor 114. The supersonic waves reflected or transmitted by the examined part may be directed to the supersonic image sensitive member by the same image conductor 114 or preferably by an additional image conductor. The supersonic image sensitive member may have the form of piezoelectric elements, such as were described above for the supersonic generator, but smaller in size. In another embodiment of invention, the supersonic image sensitive member is a vacuum tube provided with a piezoelectric continuous or mosaic electrode mounted on the inside of the endwall of said tube. Said piezo-electric screen or electrode receives the supersonic image of the examined part through the endwall of said tube and converts said image into an electrical pattern of potentials or charges which correspond to said supersonic image. Such a vacuum tube is provided with a source of electron beam, such as electron gun for irradiation of said piezoelectric screen or electrode. The electron beam scans said piezo-electric screen or target and converts thereby the electrical pattern present on said screen or electrode into electrical signals in the manner well known in the television art.

It was also found that the light should be in some cases a polarized light. I found that in many examinations, especially in examination of the human body, the light scattered by the fluids contained in the examined part produces deterioration of contrast and detail of the image. In order to overcome this difficulty, a sheet 160 or a prism of material, such as calcite or tourmaline, which polarizes the light, is placed in front of the light source 7, 109 or 135. Another filter 161, which transmits only the polarized light and reflects the scattered light, is placed in front of the image pick-up member 16a, 16B, 16C, 16D, 120, 131 or 127. The scattered light is not polarized and will be therefore reflected by the filter 161. As a result, it will, therefore, be prevented from reaching the image pick-up element and will not fog the image any more. This improvement applies to all embodiments of invention.

Another complication encountered in operation of this device was fogging of the windows 12 or 18, 152, 153 or any other windows, due to condensation of vapor when entering the parts having a higher temperature, such as recesses of the living body. I found that the use of electrically conducting glass for windows, which is connected to an extraneous source of the electrical potential, prevents the condensation of vapor. Another solution of this problem is to provide a double-walled window containing a transparent silica gel. This improvement applies to all embodiments of my device.

It should be understood that in all embodiments of invention the source of illumination may be disposed in such a manner that its long axis is in the long axis of the endoscope or that its long axis is perpendicular to the long axis of the endoscope. The same applies to all image sensitive members.

It should be understood that in all embodiments of my invention, the light source or source of an invisible image forming radiation may be disposed inside of the endoscope or may be disposed outside of the endoscope. Furthermore said source of image forming radiation may be supported by the endoscope or may be completely independent of the endoscope. This applies to sources of field illumination and to sources of scanning illumination.

It should be also understood that the term "light" used in specification and in appended claims comprises both visible and invisible radiations and also represents both electro-magnetic, acoustic and corpuscular radiations.

It should be further understood that in all embodiments of invention the source of image forming radiation may be disposed outside of the examined body and projected into the examined body by a suitable optical system or by a light conductor.

My device may also be used, instead for reproducing images, for transmitting signals from the interior of the examined part, which signals represent desired information.

As various possible embodiments might be made of the above invention, and as various changes might be made in the embodiment above set forth, it is to be understood that all matter herein set forth or shown in the accompany drawings is to be interpreted as illustrative and not in a limiting sense.

What I claim is:

1. A device for examination of an inaccessible part comprising in combination an elongated tubular housing having a flexible portion adapted in size and shape for introducing into said part, a source of light for illumination of the examined area of said part carried by said housing, a window in said housing for admitting the image of said area, optical means comprising an image demagnifying member for reducing the image of said examined area, a bundle of fibers comprising a plurality of fibers operating by internal reflection of light disposed in said housing and having its end-face mounted adjacent said optical means for receiving and transporting said image, each of said plurality of fibers having a core of light transparent material having a high index of refraction and each of said plurality of fibers covered by its own separate coating secured thereto and independent of the coating of adjacent fibers, said coating being of material having a lower index of refraction than said light transparent material, said coating being relatively thin in comparison to said core having the thickness of the order of microns and spacing each of said fibers from adjacent fibers for preventing escape of light from one fiber to another, said fibers being free from each other along the major part of their length and being long in relation to their diameter so that the light is reflected in said fibers internally a number of times without appreciable loss of intensity, said fibers furthermore being assembled as to provide an end-face of an appreciable cross-section, said bundle comprising in addition means for maintaining said fibers at each end-face of said bundle in a fixed spatial relationship to each other.

2. A device for examination of an inaccessible part comprising in combination an elongated tubular housing having a flexible portion adapted in size and shape for introducing into said part, a source of light for illumination of the examined area of said part carried by said housing, a window in said housing for admitting the image of said area, optical means comprising an image demagnifying member for reducing the image of said examined area, a bundle of fibers comprising a plurality of fibers operating by internal reflection of light disposed in said housing and having its end-face mounted adjacent said optical means for receiving and transporting said image, each of said plurality of fibers having a core of light transparent material having a high index of refraction and each of said plurality of fibers covered by its own separate coating secured thereto and independent of the coating of adjacent fibers, said coating being of material having a lower index of refraction than said light transparent material, said coating being relatively thin in comparison to said core having the thickness of the order of microns and spacing each of said fibers from adjacent fibers for preventing escape of light from one fiber to another, essentially all said fibers being not connected to each other along the major part of their length and being long in relation to their diameter so that the light is reflected in said fibers internally a number of times without appreciable loss of intensity, said fibers furthermore being assembled as to provide an end-face of an appreciable cross-section, said bundle comprising in addition means for maintaining said fibers at each end-face of said bundle in a fixed spatial relationship to each other, said bundle furthermore having both end-faces uncovered.

3. A device for examination of an inaccessible part comprising in combination an elongated tubular housing having a flexible portion adapted in size and shape for introducing into said part, a source of light for illumination of the examined area of said part carried by said housing, a window in said housing for admitting the image of said examined area, optical means comprising an image demagnifying member for reducing the image of said examined area, a bundle of fibers comprising a plurality of fibers operating by internal reflection of light disposed in said housing and having its end-face mounted adjacent said optical means for receiving and transporting said image, each of said plurality of fibers having a core of a light transparent material having a high index of refraction and each of said plurality of fibers covered by its own separate coating secured thereto and independent of the coating of adjacent fibers, said coating being of material having a lower index of refraction than said light transparent material, said coating being relatively thin in comparison to said core having a thickness of the order of microns and spacing each of said fibers from adjacent fibers for preventing escape of light from one fiber to another, essentially all said fibers having the thickness of a fraction of one millimeter, being not connected to each other along the major part of their length and being long in relation to their diameter so that the light is reflected in said fibers internally a number of times without appreciable loss of intensity, said fibers furthermore being assembled as to provide an end-face of an appreciable cross-section, said bundle comprising in addition means for maintaining said fibers at each end-face of said bundle in a fixed spatial relationship to each other, said device comprising in addition means separating said light source from the end-face of said bundle of fibers, whereby substantially only the light reflected by said examined area can reach the end-face of said bundle of fibers.

4. A device for examination of an inaccessible part comprising in combination an elongated tubular housing having a flexible portion adapted in size and shape for introducing into said examined part, a source of light for illumination of the examined area of said part carried by said housing, a window in said housing for admitting the image of said area, optical means comprising an image demagnifying member for reducing the image of said examined area, a bundle of fibers comprising a plurality of fibers operating by internal reflection of light disposed in said housing and having its end-face mounted adjacent said optical means for receiving and transporting said image, each of said plurality of fibers having a core of light transparent material having a high index of refraction and each of said plurality of fibers covered by its own separate coating secured thereto and independent of the coating of adjacent fibers, said coating being of material having a lower index of refraction than said light transparent material, said coating being relatively thin in comparison to said core having the thickness of the order of microns and spacing each of said fibers from adjacent fibers for preventing escape of light from one fiber to another, essentially all said fibers being not connected to each other along the major part of their length and being long in relation to their diameter so that the light is reflected in said fibers internally a number of times without appreciable loss of intensity, said fibers furthermore being assembled as to provide an end-face of an appreciable cross-section, said bundle comprising in addition means for maintaining said fibers at each end-face of said bundle in a fixed spatial relationship to each other and said maintaining means comprising a binder material, said binder material being disposed only at the end-faces of said bundle.

5. A device for examination of an inaccessible part comprising in combination an elongated tubular housing having a flexible portion adapted in size and shape for introducing into said examined part, a source of light for illumination of the examined area of said part carried by said housing, a window in said housing for admitting the image of said area, optical means comprising an image demagnifying member for reducing the image of said examined area, a bundle of fibers comprising a plurality of fibers operating by internal reflection of light disposed in said housing and having its end-face mounted adjacent said optical means for receiving and transporting said image, each of said plurality of fibers having a core of a light transparent material having a high index of refraction and each of said plurality of fibers covered by its own separate coating secured thereto and independent of the coating of adjacent fibers, said coating being of material having a lower index of refraction than said light transparent material, said coating being relatively thin in comparison to said core having the thickness not exceeding a few microns and spacing each of said fibers from adjacent fibers for preventing escape of light from one fiber to another, essentially all said fibers being in contact with adjacent fibers along the major part of their length, and being long in relation to their diameter so that the light is reflected in said fibers internally a number of times without appreciable loss of intensity, said fibers furthermore being assembled as to provide an end-face of an appreciable cross-section, said bundle comprising in addition means for maintaining said fibers at each end-face of said bundle in a fixed spatial relationship to each other, said maintaining means being disposed only at the end-faces of said bundle.

6. A device for examination of an inaccessible part comprising in combination an elongated tubular housing having a flexible portion adapted in size and shape for introducing into said examined part, a source of light for illumination of the examined area of said part carried by said housing, a window in said housing for admitting the image of said area, optical means comprising an image demagnifying member for reducing the image of said examined area, a bundle of fibers comprising a plurality of fibers operating by internal reflection of light disposed in said housing and having its end-face mounted adjacent said optical means for receiving and transporting said image, each of said plurality of fibers having a core of a light transparent material having a high index of refraction and each of said plurality of fibers covered by its own separate coating secured thereto and independent of the coating of adjacent fibers, said coating being of material having a lower index of refraction than said light transparent material, said coating being relatively thin in comparison to said core having the thickness not exceeding a few microns and spacing each of said fibers from adjacent fibers for preventing escape of light from one fiber to another, essentially all said fibers being independent of each other along the major part of their length and being long in relation to their diameter so that the light is reflected in said fibers internally a number of times without appreciable loss of intensity, said fibers furthermore being assembled as to provide an end-face of an appreciable cross-section, said bundle comprising in addition means for maintaning said fibers at each end-face of said bundle in a fixed spatial relationship to each other, said bundle comprising furthermore means for maintaining said fibers at each end-face of said bundle in a fixed spatial relationship to each other and said maintaining means comprising a binder material, said binder material being disposed only at the end-faces of said bundle, said device comprising in addition means separating said light source from the end-face of said bundle of fibers, whereby substantially only the light reflected by said examined area can reach the end-face of said bundle of fibers, said device comprising furthermore means for insufflating air into said examined part.

7. A device for examination of an inaccessible part comprising in combination an elongated tubular housing having a flexible portion adapted in size and shape for introducing into said examined part, a source of light for illumination of the examined area of said part carried by said housing, a window in said housing for admitting the image of said area, optical means comprising an image demagnifying member for reducing the image of said examined area, a bundle of fibers comprising a plurality of fibers operating by internal reflection of light disposed in said housing and having its end-face mounted adjacent said optical means for receiving and transporting said image, each of said plurality of fibers having a core of a light transparent material having a high index of refraction and each of said plurality of fibers covered by its own separate coating secured thereto and independent of the coating of adjacent fibers, said coating being of material having a lower index of refraction than said light transparent material, said coating being relatively thin in comparison to said core having the thickness not exceeding a few microns and spacing each of said fibers from adjacent fibers for preventing escape of light from one fiber to another, essentially all said fibers being not connected to adjacent fibers along the major part of their length and being long in relation to their diameter so that the light is reflected in said fibers internally a number of times without appreciable loss of intensity, said fibers furthermore being assembled as to provide an end-face of an appreciable cross-section, said bundle comprising in addition means for maintaining said fibers at each end-face of said bundle in a fixed spatial relationship to each other, said device comprising in addition means separating said light source from the end-face of said bundle of fibers, whereby substantially only the light reflected by said examined area can reach the end-face of said bundle of fibers.

8. A device for examination of an inaccessible part comprising in combination an elongated tubular housing having a flexible portion adapted in size and shape for introducing into said examined part, a source of light for illumination of the examined area of said part carried by said housing, a window in said housing for admitting the image of said area, optical means comprising an image demagnifying member for receiving the image of said examined area, a bundle of fibers comprising a plurality of fibers operating by internal reflection of light disposed in said housing and having its end-face mounted adjacent said optical means for receiving and transporting said image, each of said plurality of fibers having a core of a light transparent material having a high index of refraction and each of said plurality of fibers covered by its own separate coating secured thereto and independent of the coating of adjacent fibers, said coating being of material having a lower index of refraction than said light transparent material, said coating being relatively thin in comparison to said core having the thickness of the order of microns and spacing each of said fibers from adjacent fibers for preventing escape of light from one fiber to another, said fibers being independent from each other along the major part of their length and being long in relation to their diameter so that the light is reflected in said fibers internally a number of times without appreciable loss of intensity, said fibers furthermore being assembled as to provide an end-face of an appreciable cross-section, said bundle comprising in addition means for maintaining said fibers at each end-face of said bundle in a fixed spatial relationship to each other, said device comprising furthermore photoelectric means mounted in cooperative relationship with said housing.

9. A device for examination of an inaccessible part comprising in combination an elongated tubular housing having a flexible portion adapted in size and shape for introducing into said examined part, a source of light for illumination of the examined area of said part carried by said housing, a window in said housing for admitting the image of said area, optical means comprising an image demagnifying member for receiving the image of said examined area, a bundle of fibers comprising a plurality of fibers operating by internal reflection of light disposed in said housing and having its end-face mounted adjacent said optical means for receiving and transporting said image, each of said plurality of fibers having a core of a light transparent material having a high index of refraction and each of said plurality of fibers covered by its own separate coating secured thereto and independent of the coating of adjacent fibers, said coating being of material having a lower index of refraction than said light transparent material, said coating being relatively thin in comparison to said core having the thickness not exceeding a few microns and spacing each of said fibers from adjacent fibers for preventing escape of light from one fiber to another, said fibers being not connected to each other along the major part of their length and being long in relation to their diameter so that the light is reflected in said fibers internally a number of times without appreciable loss of intensity, said fibers furthermore being assembled as to provide an end-face of an appreciable cross-section, said bundle comprising in addition means for maintaining said fibers at each end-face of said bundle in a fixed spatial relationship to each other, said bundle comprising in addition means for maintaining said fibers at each end-face of said bundle in a fixed spatial relationship to each other and said maintaining means being disposed only at the end-faces of said bundle, said device comprising furthermore photoelectric means mounted in cooperative relationship with said housing and said photoelectric means comprising a vacuum tube.

References Cited in the file of this patent

UNITED STATES PATENTS

| | | |
|---|---|---|
| 1,751,584 | Hansell | Mar. 25, 1930 |
| 2,122,750 | Nicolson | July 5, 1938 |
| 2,324,057 | Bennett | July 13, 1943 |
| 2,342,778 | Hanns-Heinz Wolff | Feb. 29, 1944 |
| 2,412,659 | Thomas | Dec. 17, 1946 |
| 2,472,889 | Du Mont | June 14, 1949 |
| 2,520,507 | Marcy | Aug. 29, 1950 |
| 2,527,550 | Hess | Oct. 31, 1950 |
| 2,747,131 | Sheldon | May 22, 1956 |
| 2,747,132 | Sheldon | May 22, 1956 |
| 2,764,148 | Sheldon | Sept. 25, 1956 |
| 2,764,149 | Sheldon | Sept. 25, 1956 |
| 2,786,955 | Trolan | Mar. 26, 1957 |
| 2,788,390 | Sheldon | Apr. 9, 1957 |
| 2,825,260 | O'Brien | Mar. 4, 1958 |

FOREIGN PATENTS

| | | |
|---|---|---|
| 526,643 | Germany | June 8, 1931 |
| 158,149 | Great Britain | Feb. 3, 1921 |
| 885,770 | Germany | Aug. 6, 1953 |